Figure 1:
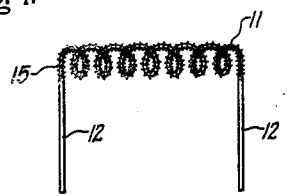

Sept. 7, 1943.  G. E. INMAN  2,329,118

ELECTRODE FOR ELECTRICAL DISCHARGE DEVICES

Filed July 12, 1941

Inventor:
George E. Inman,
by John H. Anderson
His Attorney.

Patented Sept. 7, 1943

2,329,118

UNITED STATES PATENT OFFICE 2,329,118

ELECTRODE FOR ELECTRICAL DISCHARGE DEVICES

George E. Inman, East Cleveland, Ohio, assignor to General Electric Company, a corporation of New York Application July 12, 1941, Serial No. 402,117

9 Claims. (Cl. 250—27.5)

This invention relates to electrodes for electrical discharge devices, and particularly to cathode construction for such devices. The invention is very advantageous for fluorescent electric lamps or tubes, and is hereinafter explained with special reference to its use in such lamps.

The requirements for cathodes of fluorescent tubes are somewhat contradictory, and difficulty has been experienced in reconciling the contradictions in one construction. On the one hand, it is desirable that the cathode should heat up and become fully emissive very quickly, which has suggested a construction consisting of fine refractory metal wire compactly coiled, and coated or impregnated with refractory electron-emissive material. On the other hand, it is desirable that the active cathode surface should all be at substantially the same potential, which would require a more massive cathode structure to afford high conductivity. If, moreover, the cathode is very thin,—as in a coil of fine wire,—the spot where the electric discharge or arc strikes may become locally overheated, and may even get so hot that emissive material on the cathode coil vaporizes and deposits on the nearby wall of the lamp tube.

One construction that has been proposed consists of a coiled coil of fine wire with the mandrel wire on which the first and smaller coil is wound left in place in this small coil, when and after the latter is wound into a larger coil, to serve as a current conductor in the completed tube or lamp. This, however, has proved to be subject to the drawbacks of not heating up quickly enough; furthermore, it is difficult to get a sufficient amount of activating material to adhere to such a cathode, or to remain in intimate contact with the metal.

In accordance with my invention, I meet and reconcile the contradictory cathode requirements above indicated, and overcome the drawbacks of prior constructions, by a peculiar structural combination. For the more active portion of the cathode, I employ a coil of tungsten or other metal wire (whether round, or of angular or flattened cross-section, like a strip or ribbon) which may be of a size suitable for rapid heating and easy starting. With this I associate a conductor wire or rod which is larger in cross-section, and engages the convolutions or turns of the finer wire at a series of isolated points. The conductor wire may be fitted to the coil so that they inter-engage at points corresponding to their cross-sectional configurations, which are here shown as dissimilar,—one round and the other polygonal, or substantially so. This conductor wire may be considerably larger than the fine wire, so as to carry current easily to the sections of the convolution of the fine wire, and to receive heat from sections that tend to overheat and redistribute it to other sections and convolutions,—thus equalizing and keeping down the temperature of the active portion of the cathode sufficiently to prevent objectionable heat effects on the emissive material of the cathode. The structure is relatively strong and rugged, yet there is room and surface for an ample quantity of activating material, both on the fine wire and in contact with the base or conductor wire.

One form that such a construction may take consists of a round helical coil of finer wire with a polygonal conductor wire therein engaging each convolution of the aforementioned coil at the angles or vertices of the polygonal cross-section. For example, the larger wire may be triangular, and preferably equilateral; or quadrangular, and preferably square; or even pentagonal, hexagonal, etc.

Another form of construction consists of a polygonal coil of finer wire with a circular or polygonal conductor wire therein engaging each convolution of the fine wire at a series of points each of which is intermediate in the length of a side of the polygon formed by the convolution. When the conductor wire is circular, the sides of each polygonal convolution of the other wire are tangent to the periphery of the conductor wire.

In any of the forms above mentioned or indicated, the coil of finer wire and the conductor wire engaged therein may themselves be coiled up into a larger coil, and this recoiling may be repeated if desired. Isolated points of engagement of the finer wire with each convolution of the other wire may be fixed and maintained by the mere configuration of the conductor wire and the coil of fine wire, without welding at the points of contact; or the wires may be welded where they engage, if this is thought desirable for reasons of better electrical or thermal conduction, or greater mechanical stiffness, or for any other reason.

Other features and advantages of the invention will become apparent from the following description of species and forms of embodiment, and from the drawing.

Figure 2:
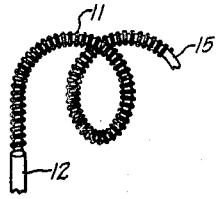

In the drawing, Fig. 1 is a general side view of a coiled coil cathode construction conveniently embodying the invention; and Fig. 2 is a fragmentary side view on a larger scale.

Figure 3:
Figure 4:
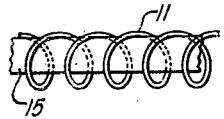

Fig. 3 shows a cross-section of one preferred form of cathode construction embodying the invention, on a still larger scale than Fig. 2; Fig. 4 is a corresponding fragmentary side view, before the second coiling; and Figs. 5 and 6 are similar views illustrating a modification of the form shown in Figs. 3 and 4.

Figure 5:
Figure 6:
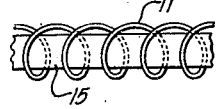
Figure 7:
Figure 8:
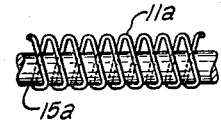
Figure 9:
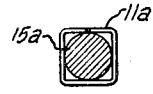
Figure 10:
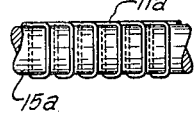

Figs. 7 and 8 are views similar to Figs. 2-6 illustrating another preferred form of cathode construction; and Figs. 9 and 10 are similar views illustrating a modification of the form shown in Figs. 7 and 8.

Figure 11:
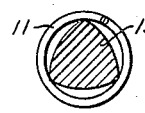
Figure 12:
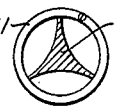
Figure 13:
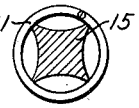
Figure 14:
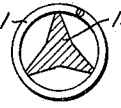
Figure 15:
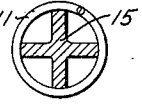

Figs. 11, 12, 13, 14 and 15 are cross-sectional views similar to Figs. 3 and 5, illustrating other forms of cross-section of the conductor wire with the associated coil of other wire, Fig. 11 showing a polygonal conductor wire with convexly rounded sides, Figs. 12 and 13 showing polygonal conductor wires with concavely rounded sides, and Figs. 14 and 15 showing hollow-sided conductor cross sections of other configurations.

Figure 16:
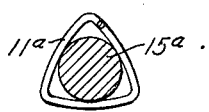
Figure 17:
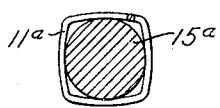

Figs. 16 and 17 are cross-sectional views similar to Figs. 7 and 9 showing polygonal coils in which the sides of the polygonal convolutions are bent outward at their points of contact with the conductor wire.

As shown in Figs. 1 and 2, the cathode comprises a coiled coil of relatively fine wire 11 connected to lead-wire supports 12, 12, and including a conductor wire 15 of larger cross-section than the wire 11, also connected to the lead-wire supports 12, 12. As shown in Figs. 3-6, the wire 11 is formed into a round coil, preferably circular, while the wire 15 is of polygonal cross-section, which may be triangular and equilateral, as in Figs. 3 and 4, or quadrangular and square, as in Figs. 5 and 6. The wire 11 may receive its first coiling by winding it directly on the polygonal wire 15 as a mandrel, under such relatively light tension that the coil of wire 11 does not conform to the angularity of the wire 15, but remains of a rounded or circular configuration; or the wire 11 may first be wound on a round mandrel (not shown), and then removed therefrom and slipped over the polygonal wire 15. In either case, the wire 15 with the coil of wire 11 thereon may afterward be coiled on a mandrel (not shown, but preferably larger than the wire 15) to make the coiled coil shown in Figs. 1 and 2.

As shown in Figs. 7-10, the coil of wire 11a is of polygonal cross-section, which may be triangular and equilateral, as in Figs. 7 and 8, or quadrangular and square, as in Figs. 9 and 10. In either case, the wire coil 11a is first wound on a polygonal mandrel (not shown), and then removed and slipped over the round wire 15a. After this, the wire 15a with the coil 11a thereon is coiled on another mandrel (not shown) to make the coiled coil shown in Figs. 1 and 2.

In all the forms of construction illustrated and described, practically the entire surface of the wire 11 or 11a that forms the more active portion of the cathode is available and sufficiently exposed for coating with activating electron-emissive material,—such as various well-known refractory oxides,—which may also come in contact with the base or conductor-wire 15 or 15a at the points of engagement between the two wires, or even coat the wire 15 or 15a completely. Moreover, the spacing of the wire 11 or 11a from the wire 15 or 15a provides space for the activating material and recesses favorable to its retention. The conductor wire 15 or 15a engages each convolution or turn of the coiled wire 11 or 11a at a series of fixed isolated points which provide adequate current and heat-transmitting connections for the sections of each convolution corresponding to these points of connection; and the wire 15 or 15a is everywhere close enough to the wire 11 or 11a to absorb heat radiated from overheated sections of the wire 11 or 11a and redistribute it by radiation to other sections,—as well as by direct metallic conduction. At the same time, the wire 11 or 11a can become hot enough without excessive electrical resistance in the cathode; while the particular point where the arc strikes can be as hot as is desirable without overheating objectionably.

For both the form of construction illustrated in Figs. 3-6 and that illustrated in Figs. 7-10, considerable flexibility of design is possible, not only by varying the pitch of the coil of wire 11 or 11a, and the relative sizes of the wires 11 or 11a and 15 or 15a, but also by varying the number of points of contact between each convolution of the wire 11 or 11a and the wire 15 or 15a, and the consequent degree of proximity of the wire 11 or 11a to the wire 15 or 15a between the points of contact. A further factor of flexibility in design is the choice between polygonal and circular wires 15 and 15a, giving either a more or less "normal" type of contact as in Figs. 3-6, or a tangential contact as in Figs. 7-10, and the option of spot welding the wire 11 or 11a to the wire 15 or 15a.

While I have described several preferred forms of construction and embodiment of my invention, it will be evident to those skilled in the art that the invention permits of variation beyond these forms. For example, the polygonal wire 15 for the type of construction illustrated in Figs. 3-6 might have its sides rounded either convexly or concavely, Figs. 11, 12, and 13, and might even, as an extreme, assume a star-shaped or a cruciform cross-section, Figs. 14 and 15. By lateral hollowing of the conductor wire 15 along its length, increased space for activating material is afforded, because the coil convolutions 11 (into which the wire 15 fits) lie further away from the re-entrant conductor surface with which they are out of contact. Or the wire 15 or 15a for the forms on construction represented in Figs. 3-10 might be larger than there shown in relation to the size of the coil 11 or 11a, so that the coil convolutions would have to be bent outward at their points of contact with the wire 15 or 15a, Figs. 16 and 17.

What I claim as new and desire to secure by Letters Patent of the United States is:

1. A cathode comprising as its members a wire coil forming an active portion of the cathode, and a conductor wire larger than the coiled wire extending through the coil and fitted directly to said coil, one of the said members having a polygonal configuration, so that the conductor wire engages the coil convolutions only at isolated points corresponding to the cross-sectional configurations of the coil and conductor wire.

2. A cathode comprising a coil of wire forming the active portion of the cathode and a larger polygonal conductor wire extending therethrough and engaged with the convolutions of the said coil only at a series of isolated points corresponding to angles of the polygonal cross-section of the conductor wire.

3. A cathode as set forth in claim 2 wherein the conductor wire is substantially triangular.

4. A cathode as set forth in claim 2 wherein the conductor wire is substantially quadrangular.

5. A cathode comprising a polygonal coil of wire forming the active portion of the cathode, and a larger conductor wire extending therethrough and engaged with the convolutions of the said polygonal coil only at a series of isolated points, each intermediate in the length of a side of the polygon.

6. A cathode as set forth in claim 5 wherein the conductor wire is round, and the sides of each polygonal convolution of the other wire are tangent to the periphery of the conductor wire.

7. A cathode as set forth in claim 1 wherein the conductor wire is polygonal with rounded sides.

8. A cathode as set forth in claim 1 wherein the cross-section of the conductor wire is a hollow-sided figure.

9. A cathode comprising a coil of wire forming the active portion of the cathode, and a larger conductor wire of different cross-sectional configuration from said coil extending therethrough and fitted directly thereto, but laterally hollowed along its length and largely out of contact with the convolutions.

GEORGE E. INMAN.